(No Model.)

J. H. EWING & E. L. BILL.
SHADE FOR LAMPS AND LANTERNS.

No. 254,809. Patented Mar. 14, 1882.

UNITED STATES PATENT OFFICE.

JOHN H. EWING AND EDWARD L. BILL, OF WHEELING, WEST VIRGINIA.

SHADE FOR LAMPS AND LANTERNS.

SPECIFICATION forming part of Letters Patent No. 254,809, dated March 14, 1882.

Application filed July 14, 1881. (No model.)

*To all whom it may concern:*

Be it known that we, JOHN H. EWING and EDWARD L. BILL, of Wheeling, in the county of Ohio and State of West Virginia, have invented certain new and useful Improvements in Shades for Lamps and Lanterns; and we do hereby declare the following to be a full, clear, and exact description of the invention, such as will enable others skilled in the art to which it pertains to make and use it, reference being had to the accompanying drawings, which form part of this specification.

Our invention relates to an improvement in glass lamp-shades, the object being to produce shades adapted to transmit light in downwardly-inclined pencils.

With this object in view our invention consists in a glass lamp-shade having the form of a truncated pyramid, the several faces of which are each provided with a bull's-eye lens, the said shade and its lenses being molded in one piece in a single operation.

Figure 1:
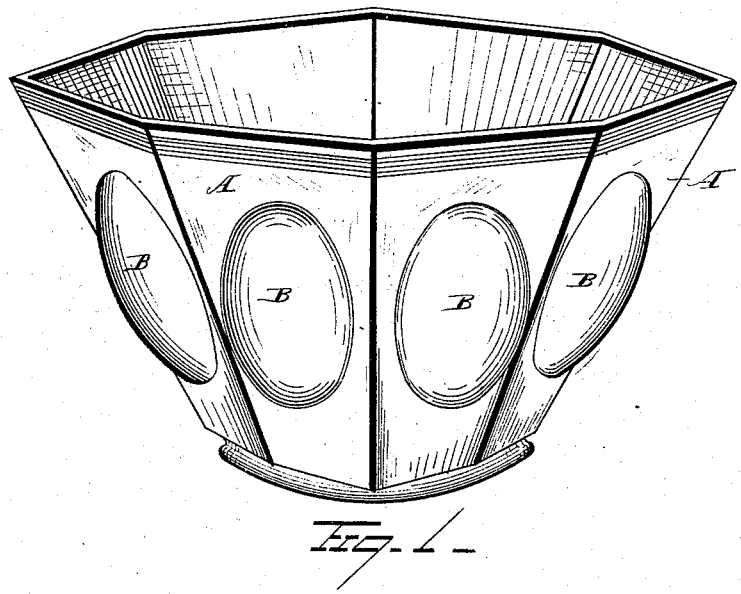
Figure 2:
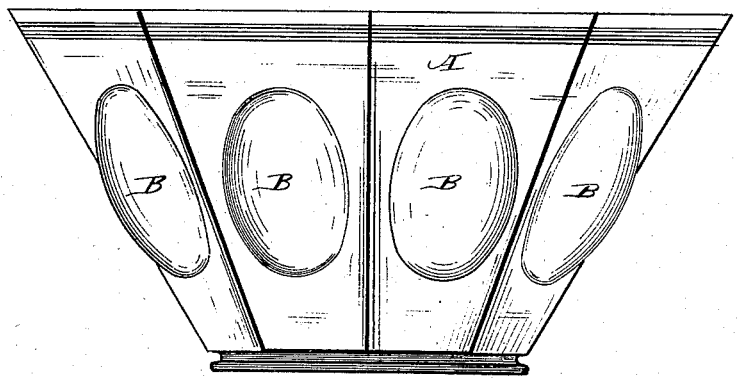

In the accompanying drawings, Figure 1 is a view in perspective of a lamp-shade made in accordance with our invention, and Fig. 2 is a view in side elevation thereof.

Our invention contemplates the formation of shades having any desired number of faces, one form only being shown in the drawings, in which—

A represents an octagonal lamp-shade adapted to transmit light in downwardly-inclined pencils by means of the bull's-eye lenses B, which are molded integral with each of the several faces of the shade. The size and power of the said lenses will depend upon the use to which the transmitted light is to be made subservient, and they may be varied according thereto.

The faces of the shades and their lenses need not be of the same color, although made integral with each other, for either one or the other may be flashed with a thin coating of glass of another color—as ruby or emerald. Again, the shades may be made of white glass and ground in such manner as to leave the lenses as originally formed in the mold.

By disposing the lenses in irregular lines around the shades the pencils of light may be made to illuminate points unequally distant from the source of light.

The shades are made complete in one operation in molds formed for the purpose.

We are aware that plane pieces of glass have had lenses formed integrally with them. We are also aware that molded shades of circular form have had concavo-convex and double-concave lenses made integral with them. We do not, therefore, make any broad claim to molded shades provided with lenses; but, Having fully described our invention, what we claim as new, and desire to secure by Letters Patent, is—

A lamp-shade consisting of a single piece of molded glass having the form of a truncated pyramid, the several faces of which are each provided with a bull's-eye lens, substantially as shown and described.

In testimony that we claim the foregoing we have hereunto set our hands this 5th day of July, 1881.

JOHN H. EWING.
EDWARD LIVINGSTON BILL.

Witnesses:
WM. L. EWING,
JAS. C. BAKER.